US006404935B1

United States Patent
Lau

(10) Patent No.: US 6,404,935 B1
(45) Date of Patent: Jun. 11, 2002

(54) AREA EFFICIENT TWO-STAGE CORRECTION LOG LOOK-UP

(75) Inventor: Chung Lau, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/325,010

(22) Filed: Jun. 2, 1999

(51) Int. Cl.[7] .............. G06K 9/40; G06F 11/30; G08C 25/00; H03M 13/00; H04L 1/00
(52) U.S. Cl. .............. 382/274; 386/50; 702/194; 714/746
(58) Field of Search .............. 714/746, 763, 714/764; 382/290, 298, 299, 309, 274; 386/50; 702/189, 190, 194

(56) References Cited

U.S. PATENT DOCUMENTS

| | | | | |
|---|---|---|---|---|
| 4,897,724 A | * | 1/1990 | Veldhuis | 348/616 |
| 5,088,053 A | * | 2/1992 | Sprague et al. | 345/535 |
| 5,189,636 A | * | 2/1993 | Patti et al. | 708/706 |
| 5,345,517 A | * | 9/1994 | Katayama et al. | 382/54 |
| 5,446,803 A | * | 8/1995 | Kunitake et al. | 382/290 |
| 5,448,654 A | * | 9/1995 | Katayama et al. | 382/298 |
| 5,621,826 A | * | 4/1997 | Katayama et al. | 382/298 |
| 5,828,784 A | * | 10/1998 | Miyashita et al. | 382/232 |
| 5,838,455 A | * | 11/1998 | Imaizumi et al. | 358/298 |
| 6,047,087 A | * | 11/1998 | Imaizumi et al. | 358/298 |
| 5,884,245 A | * | 5/1999 | Chandler | 702/189 |

* cited by examiner

*Primary Examiner*—Albert Decady
*Assistant Examiner*—Joseph D. Torres
(74) *Attorney, Agent, or Firm*—Townsend and Townsend and Crew LLP

(57) ABSTRACT

A memory look up table receives a first portion of an input data signal via an address input, and in response provides an output data signal corresponding to one of a plurality of memory locations. The output data signal includes a mathematical approximation of the input data signal, at least one first stage delta signal, and at least one second stage delta signal. Random logic is coupled to the first stage delta signal and the second stage delta signal, and receives a second portion of the input data signal on an input. In response to the second portion and the first and second stage delta signals, the random logic calculates an incrementing or decrementing signal. An incrementor coupled to the random logic increments or decrements the mathematical approximation of the input data signal according to the incrementing or decrementing signal.

25 Claims, 4 Drawing Sheets

AREA EFFICIENT TWO-STAGE CORRECTION LOG LOOK-UP

BACKGROUND OF THE INVENTION

Conventional computer graphics systems require fast and accurate power calculations when performing certain computational operations. For example, computer-generated image rendering may depict an image attribute, such as illumination and attenuation of a 3-D light source or spotlight, by converting a power value into an approximation of a mathematical function of that value. A power value of an attribute D may have a range from zero (no light) to one (full light). A feature of the attribute D, which may be attenuation over a rendered object to account for effects like specular reflection, for example, may be represented as a mathematical function of D, such as a logarithm, base 2, of D, or any other mathematical function that has a naturally smooth curve.

One way of doing a power calculation that is easily implemented in hardware or software is to calculate the antilog of:

$$P*\log_2(D)$$

where D is a multiple-bit digital representation of an attribute within a range between zero and one, and P is a multiplicative power factor of the logarithm of D. The attribute D is quantized and approximated by an n-bit integer. A digital binary signal is produced. Each additional bit used for quantizing D increases the number of quantization levels, however each additional bit used also increases the memory area required for storing $\log_2(D)$. By converting an attribute into a logarithmic function, computational processes performed on the attribute are simplified.

In order for the result to be as accurate as possible, the value of $\log_2(D)$ must be calculated as accurately as possible using all of the input bits of D. The most efficient method of providing a logarithm calculation of D is with a memory look-up table (LUT) converter that accepts a binary multiple-bit value of D as an input data signal, and in response outputs a binary multiple-bit value of the logarithm of D.

Implementing the calculation in this way sacrifices accuracy for efficiency. The output of a LUT will yield a $\log_2(D)$ value that is a step-wise approximation of a naturally smooth logarithmic curve, especially in the range of $0.5 \leq D \leq 1$. For example, when D=0.5, the magnitude of $\log_2(D)$ is 1. As D approaches 1, the magnitude of $\log_2(D)$ gradually decreases towards zero, and the curve begins to increasingly flatten. By representing $\log_2(D)$ with a 10-bit word, the maximum absolute error between the actual log curve and a digital approximation is negligible when D is between $0.0 \leq D \leq 0.5$, but becomes visibly more pronounced in the ultimately rendered image when $0.5 \leq D$, and is largest when $0.708 \leq D \leq 1.0$. Thus, even with a large number of bits, the output curve of the LUT is unacceptably coarse. Hence more than 10 bits accuracy of $\log_2(D)$ is required.

Another source of error depends on the number of bits employed to represent D. The maximum absolute error between using a 12-bit D and the full 13-bit D to calculate $\log_2(D)$ is only 2 least significant bits (LSB) for the entire range of D, with 1 LSB being the additional bit throughout the range. The error in the value of $\log_2(D)$ between a 12-bit D and a 13-bit D may be only 2 LSBs, however, though the absolute error is small, the relative percentage error is larger as D approaches 1, $\log_2(D)$ approaches 0, and after multiplication by P and anti-log ROM look-up, the absolute error is magnified. Thus, where a 12-bit D value may "break" out from a smooth value for $\log_2(D)$, the fall 13-bit D value will improve the absolute error by several LSB values. But using just one extra bit for D doubles the required memory space in the LUT for approximating the mathematical function of D.

Schemes for smoothing the step-wise gradient transitions of an approximation for $\log_2(D)$ exist, however there is a large overhead cost primarily in the amount of memory area required for each incrementally small improvement. Naturally, increasing the number of addressable entries in the LUT memory would yield a smoother output curve, however it would also boost the required memory space exponentially.

A one-to-one mapping of a 13-bit D to a 12-bit $\log_2(D)$, assuming an implicit "1" in the first significant bit of D in the range of $0.5 \leq D \leq 1.0$, would require a memory with $2^{(13-1)}$, or $2^{12}=4096$ entries, each entry being 12-bits wide. This is roughly a 50 kbit ROM which is a undesirably large.

Another implementation to smooth the rendering image attributes uses a 1-stage correction in a LUT system. The input value of D is represented as a 13-bit word. To decrease the size of the ROM by half, the last of the 13 bits is unused in the address to the LUT converter. Of the remaining 12 bits, the first bit is an implicit "1" in the range of interest of $0.5 \leq D \leq 1.0$, and 10 bits are provided as an address to the LUT memory having $2^{10}=1024$ entries, each being 14 bits wide. The twelfth bit, $b_{12}$, is used as a correction bit. A 14-bit output is divided into a 12-bit approximation of a mathematical function and a 2-bit delta signal. If correction bit $b_{12}$ is a "1," then the 12-bit approximation is neither incremented or decremented. If correction bit $b_{12}$ is a "0" the 12-bit approximation will be incremented by the value of the 2-bit delta. In this method, however, because of the problems outlined above, the unused $13^{th}$ bit is a large source of error that contributes to coarsely rendered scenes that are still undesirable.

A variation of the above discussed implementation is to use the full 13-bit address. The 13-bit address includes an implicit 1 for the first bit because of the limitation of D as being $0.5 \leq D < 1.0$, and 11 bits as an address to the ROM lookup table, with the last bit $b_{13}$ as the correction bit. The ROM would have to provide $2^{11}$ or 2048 entries of 14 bits, or 29 kbits. This is also undesirably large.

SUMMARY OF THE INVENTION

The present invention provides near-simultaneous error correction for memory-efficient approximations mathematical functions of multi-bit input data, such as may be representative of an image attribute. One embodiment of the present invention provides a circuit with a memory that receives a first portion of an input data signal via an address input and in response provides an output data signal corresponding to one of a plurality of memory locations. The output data signal includes an approximation of a mathematical function of the input data signal, at least one first stage delta signal, and at least one second stage delta signal. Random logic is coupled to receive the first stage delta signal and the second stage delta signal and receives a second portion of the input data signal on an input. Based on values of the second portion and the first and second stage delta signals, the random logic calculates an incrementing or decrementing signal. An incrementor, coupled to the random logic, increments or decrements the approximation of the input data signal according to the incrementing or decrementing signal.

In another embodiment, the present invention provides a circuit wherein the random logic provides an incrementing or decrementing signal having: (A) a value of the first stage delta signal when the first bit of the second portion of the input data signal is a "0"; (B) a value of (1) when the first bit and the second bit of the second portion of the input data signal is "0,1" and the first stage delta is "1,0", and (C) a value of (−1) when the first bit and the second bit of the second portion of the input data signal is "1,1" and the second stage delta is "1".

In yet another embodiment, the present invention provides a method for memory efficient correction of processing digital representations of image attributes. The method includes dividing an input data signal into a first portion and a second portion. The first portion is converted into an output signal with a memory look-up table, where the output signal is one of a plurality of output signals corresponding to one of a plurality of memory locations addressable by the first portion. The method further includes the step of dividing the output signal into a digital approximation of a mathematical function of the first portion, a first stage delta signal, and a second stage delta signal. An incrementing or decrementing signal, based on a logical value of the second portion of the input data signal, the first stage delta signal, and the second stage delta signal, is calculated with random logic. The approximation signal is incremented or decremented with the incrementing or decrementing signal, respectively.

In still yet another embodiment, the invention provides an image processing computer system comprising a processor unit and a memory, coupled to the processor unit, for storing a plurality of instructions for execution in said processor unit. The instructions include instructions for dividing an input data signal into a first portion and a second portion. The instructions include converting the first portion into an output signal, the output signal being one of a plurality of output signals corresponding to one of a plurality of memory locations addressable by the first portion, and dividing the output signal into an approximation signal, a first stage delta signal, and a second stage delta signal. The instructions further instruct the processor unit to calculate, with random logic, an incrementing or decrementing signal based on a logical value of the second portion of the input data signal, the first stage delta signal, and the second stage delta signal, and increment or decrement the approximation signal with the incrementing or decrementing signal, respectively.

Other features and advantages of the present invention will be apparent from the accompanying drawings, and from the detailed description that follows below:

DESCRIPTION OF THE SPECIFIC EMBODIMENTS

Figure 1:
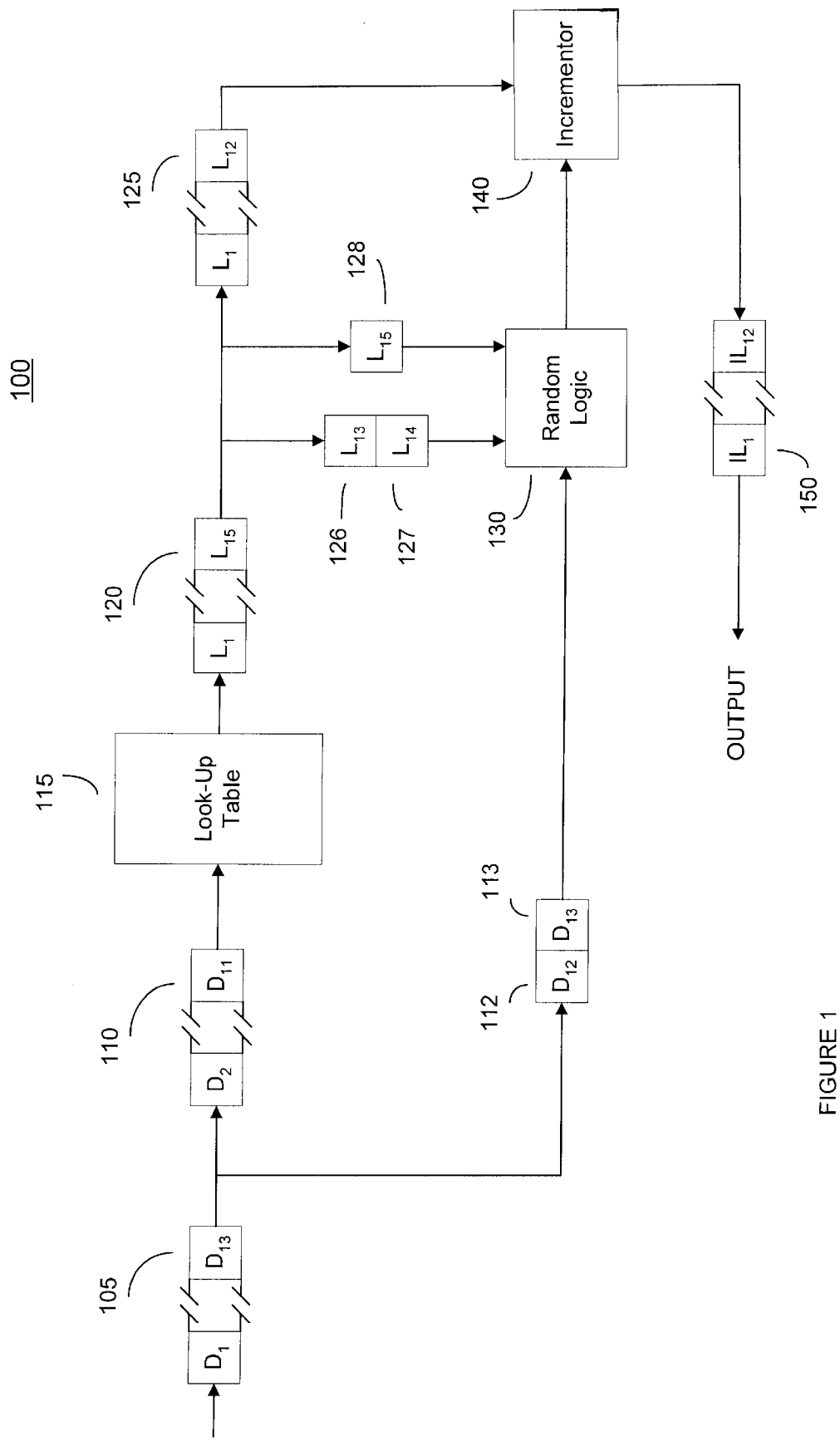
FIG. 1 is a block diagram of a system for smoothing an approximation of an attribute representation for a computer generated image rendering.

A preferred embodiment will now be described with reference to FIG. 1, which shows a block diagram of a system 100 for smoothing an approximation of a mathematical function of an digital representation of a computer generated image rendering. FIG. 1 depicts an input data 105 having $D_n$ data bits on an input data bus. In a preferred embodiment D is represented by a 13-bit word. Also in a preferred embodiment, the $1^{st}$ of the 13 bits is dropped because in the range of values of interest, where $0.5 \leq D \leq 1.0$, the $1^{st}$ bit is implicitly a "1." The dropping of the $1^{st}$ bit is not shown in FIG. 1, but it should be understood that the system 100 is directed toward smoothing the image attribute in the range of interest. A first portion 110 of the input 105 is received via an address input to a memory look-up table 115. A second portion 112 and 113, each representing one bit of the input data 105, is reserved as an input to random logic 130.

In a preferred embodiment, first portion 110 is a 10-bit word including the ten most significant bits of the input data 105. The second portion includes the eleventh and twelfth bits, the least significant bits (LSBs). Memory look-up table 115 receives the second portion 110, and in response, outputs an output data 120. In one embodiment, the memory look-up table is a read-only memory (TOM) table that has a plurality of fields or memory locations, each of which are accessible by a unique index input. In the system illustrated by FIG. 1, the 10-bit second portion 110 represents the index to the memory look-up table 115. The index value is correlated to a specific field or memory location that has a binary-encoded value, which value is output as the 15-bit output data 120. One skilled in the art would recognize various alternatives to using a ROM table for the memory look-up table 115, such as implementing the conversion of second portion 110 into output data 120 in software.

The output data 120 includes an approximation of a mathematical function 125 of the input data 105, represented by $L_n$. Since only a portion of the input data 105 was used as an index, the approximated mathematical function 125 included in the output data 120 is a step-wise approximation of an actual value of the mathematical function, and not entirely smooth. The steps in the approximation may be alleviated by using more bits for the input data 105 or the output data 120, but either would dramatically increase the memory requirements and cost of the memory look-up table 115. Thus, in the preferred embodiment, the number of bits used for the present invention reflect the optimal cost vs. image quality, and in fact shows great improvement over earlier approximation schemes.

The 15-bit output data 120 includes the approximation 125 representation which is a 12-bit word. The remaining bits of output data 120 are reserved for the random logic 130 as a two-stage correction. The two-stage correction includes a first stage delta input to the random logic which is comprised of two bits 126 and 127. A second stage delta input to the random logic is comprised of at least one bit 128. The first stage delta 126, 127, the second stage delta 128, and the second portion 111, 112, of the input data 105 are provided as inputs to the random logic 130, with which the random logic 130 will output an incrementing or decrementing signal 135 according to the following logic statements:

when D12 (112) is a logic "0" then the incrementing signal equals the value of the first stage delta 126, 127;

when D12 and D13 are logic "0,1" and the value of the first stage delta (126, 127) equals binary 2, then the incrementing signal is (+1);

when D12 and D13 are logic "1,1" and the value of the second stage delta (128) equals binary 1, then the signal decrements by (−1).

The logic statements provide the incrementing or decrementing signal that will provide the greatest smoothing of the approximation of a mathematical function 125. However, a person of ordinary skill will recognize that the logic statements given above may be modified without departing from the spirit and scope of the present invention. For example, the incrementing or decrementing signal may have slightly different values depending on the type of attribute being processed in the present image processing system.

The incrementing or decrementing signal 135 is output to an incrementor 140, which will adjust the value of the approximation 125 by whatever value is produced in the random logic 130. The output is an incremented or decremented approximation of a mathematical function 150 of the input data D. The output function 150 is preferably a 12-bit word that is smoother over the range of $0.5 \leq D \leq 1.0$ than the approximation 125 from the memory look-up table 115, and no additional memory or memory resources are consumed.

Figure 2A:
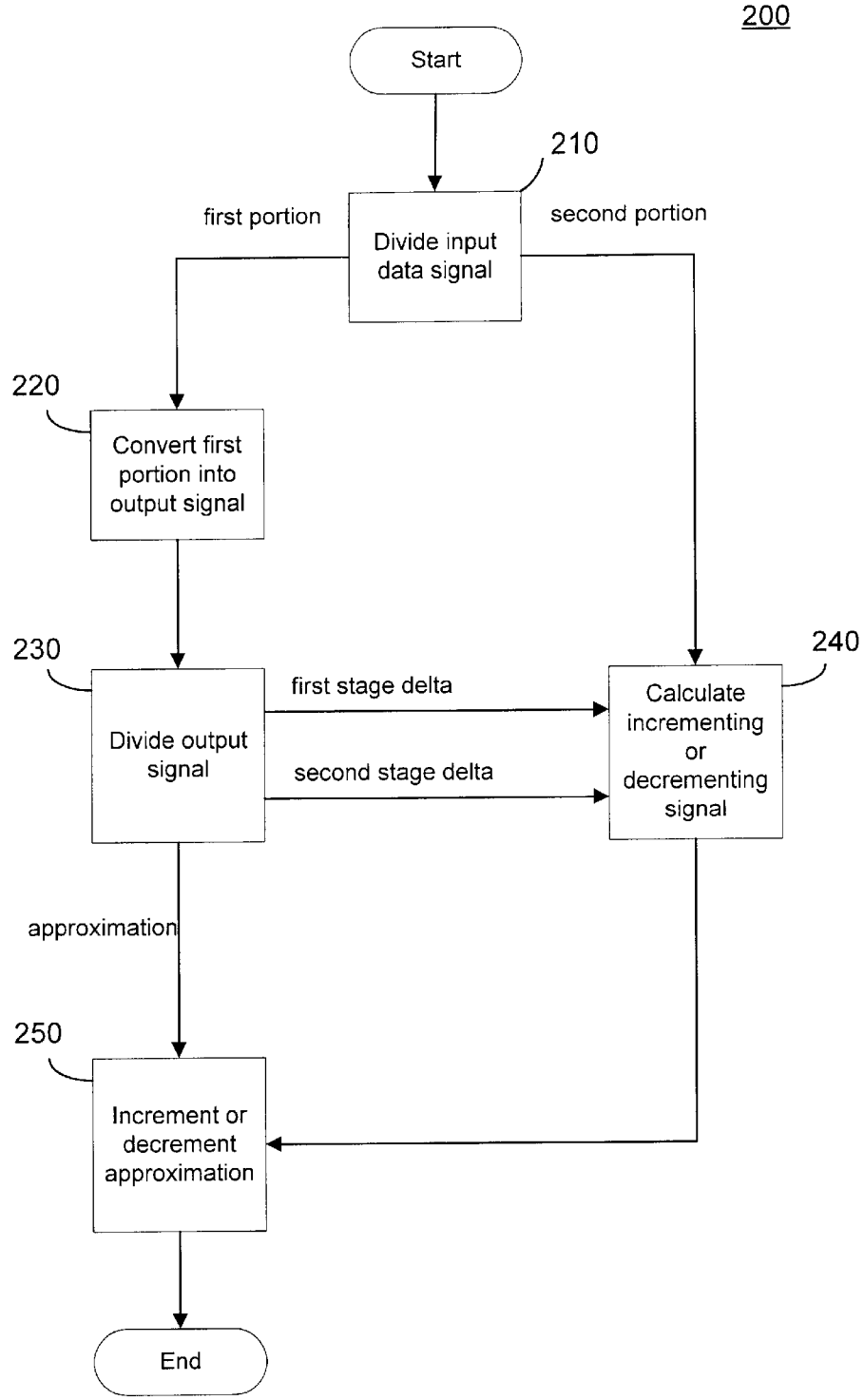
FIG. 2A is a flow diagram illustrating one embodiment for smoothing an approximation of an attribute according to the invention.

FIG. 2A is a flow diagram illustrating one embodiment 200 of image processing using a two-stage correction. In block 210 an input data signal is divided into a first portion and a second portion. Preferably, an input is a 13-bit word representative of an image attribute, and representing a value between zero and one. The range of interest in the input data signal is between one-half and one, so the first bit, an implicit "1", is dropped. Thus, the remaining 12 bits are the input data signal in a preferred embodiment of the present invention.

At block 220, the first portion of the input data signal is converted into an output signal. In a preferred embodiment, the output signal is a 15-bit word, and the conversion is done by a memory look-up table having a plurality of 15 bit memory locations, each of which is addressable by a value of the first portion. At block 230, the output signal is divided into three parts in one embodiment: an approximation of a mathematical function of the input data signal, a first stage delta signal, and a second stage delta signal. In a specific embodiment, the approximation is a 12-bit logarithm, base 2, of the input data signal. In another embodiment, the first stage delta signal is a 2-bit word, and the second stage delta signal is a 1-bit word. The first stage delta signal and the second stage delta signal comprise the first and second stage correction factors, respectively, for smoothing the mathematical approximation.

The second portion of the input data signal, the first stage delta, and the second stage delta are combined in block 240 to calculate an incrementing or decrementing signal. The incrementing or decrementing signal will slightly add to, or remove from, the value of the approximation in order to smooth step-wise transitions, which will whenever an attribute is quantized and converted into binary form. In block 250, the approximation of the mathematical function is incremented or decremented according to the incremental or decremental signal.

Figure 2B:
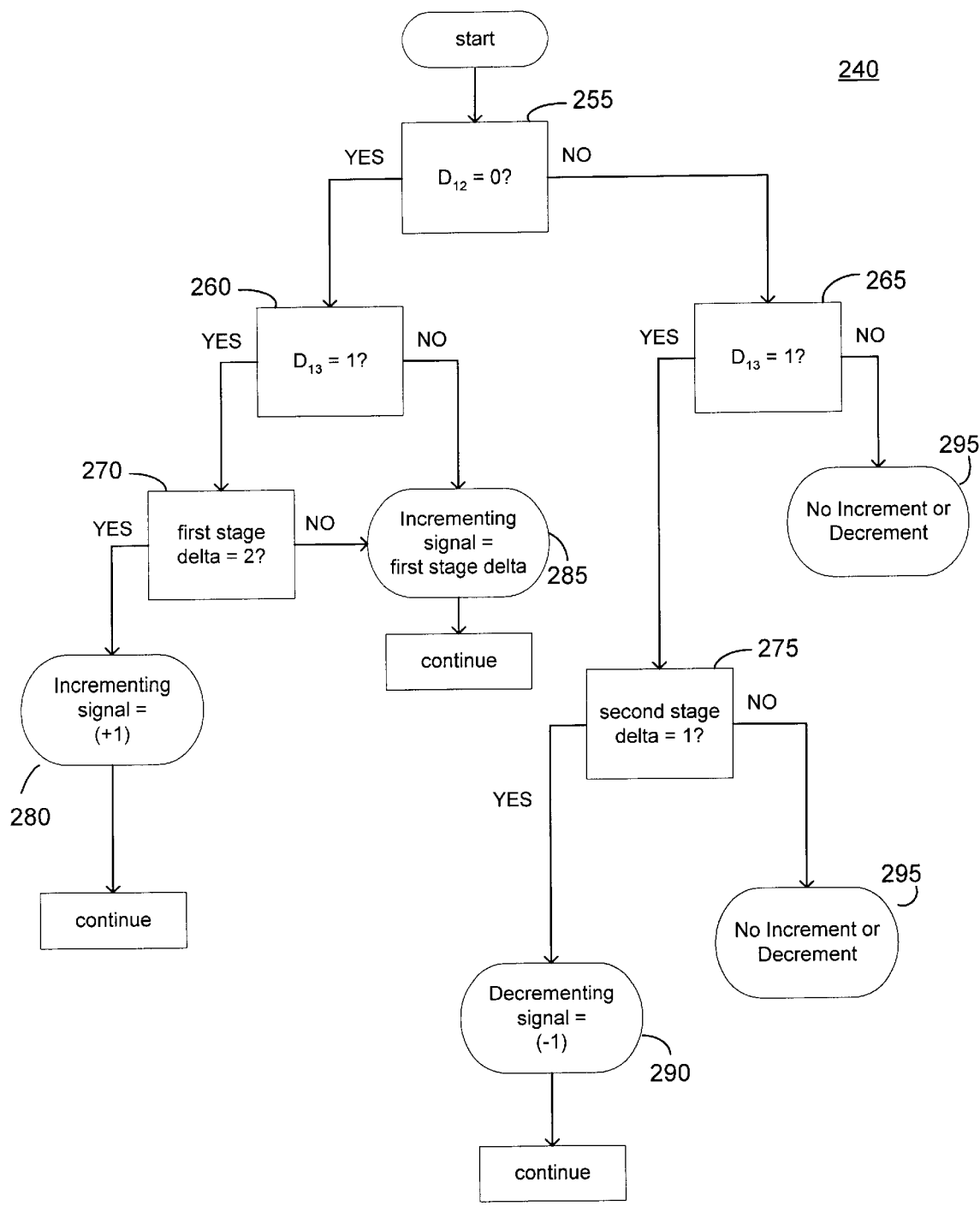
FIG. 2B is a flow diagram illustrating a specific embodiment for calculating an incrementing or decrementing signal according to the invention.

FIG. 2B is a flow diagram illustrating a specific embodiment 240 for calculating an incrementing or decrementing signal according to the invention. In block 255, the binary value of $D_{12}$ is ascertained. When it is "0" then in block 260 the binary value of $D_{13}$ is ascertained. When bit $D_{13}$ is not a "1" then the incrementing signal, in block 285, will be a value substantially equal to the value of the first stage delta signal. Thus, in block 250 in FIG. 2A, the approximation is incremented by the value of the first stage delta signal. When $D_{13}$ is "1", the binary value of the 2-bit first stage delta is ascertained. When the first stage delta signal in block 270 has a value of binary 2, or "1,0" the incrementing signal will be (+1), and not the value equal to the first stage delta signal (+2). Thus, in block 280, the incremental signal will increment the approximation by a value that is one-half of the step differential that would occur between $D_{12}, D_{13}$="0,1" and $D_{12}, D_{13}$="1,0". So for a 12-bit logarithm approximation of the input data, the degree of accuracy is greater than using a 13-bit word. When the first stage delta signal does not have a value of 2, in block 295, the incrementing signal will be a value substantially equal to the value of the first stage delta signal as shown above in reference to block 285.

Referring back to block 255, if $D_{12}$ is not "0" then again the value of bit $D_{13}$ is ascertained in block 265. When $D_{13}$ is "1", then the value of the second stage delta signal is ascertained in block 275. In the preferred embodiment, the second stage delta signal is a 1-bit word having only binary 0 or binary 1 as possible values. When the second stage delta signal is "1" the decrementing signal to be applied to the approximation is (−1), at shown in block 290. When the second stage delta signal is not "1", or when it is "0", there is no incrementing or decrementing signal calculated, at block 295, and the routine is repeated for a next incoming series of second portion data and first and second stage delta signals. For ease of illustration, all blocks 295 relate to the situation where no incrementing or decrementing signal is produced, and the approximation signal is output without being incremented or decremented.

One skilled in the art will recognize that the flow diagram could be altered without departing from the scope of the invention. For example, in block 255, the ascertaining of $D_{12}$ could be represented herein as whether or not the bit is "1" instead of "0" has shown. Further, the number of bits in each of the signals used to perform the calculation may be increased or decreased, and the value assigned to the incrementing or decrementing signal likewise modified. Furthermore, the flow charts illustrated in FIGS. 2A and 2B may be implemented in hardware, or in software within a microprocessor responsive to instructions from a memory, as discussed below.

Figure 3:
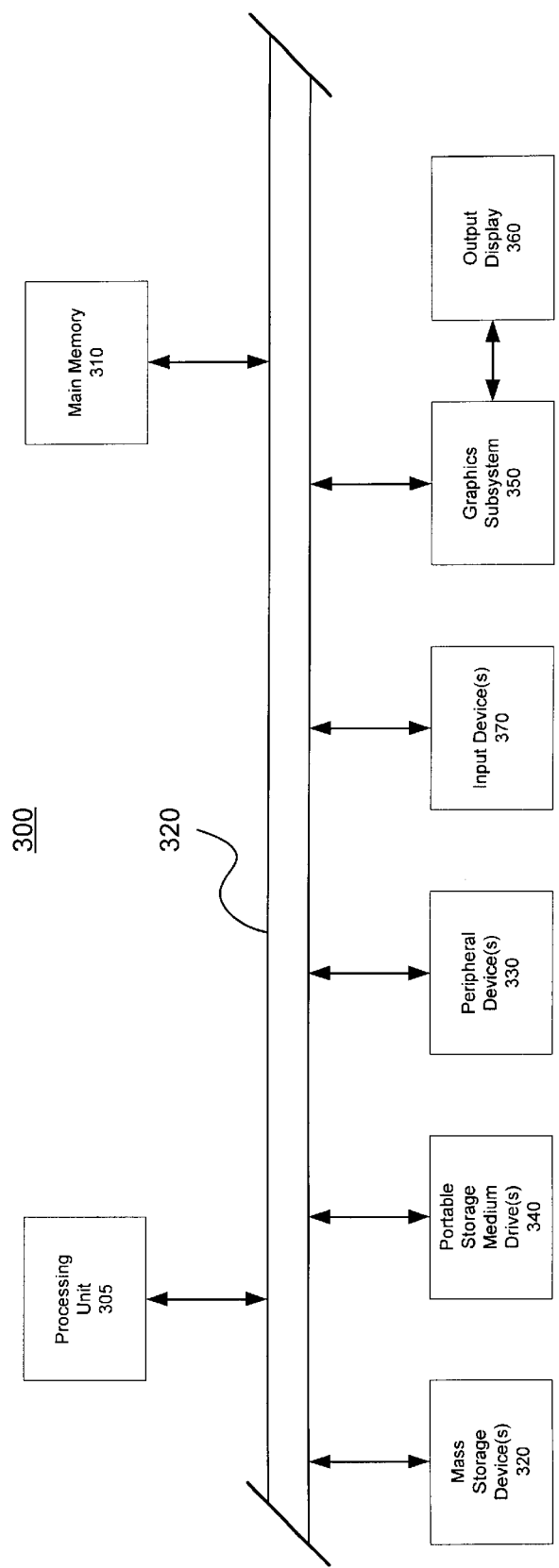
FIG. 3 is a high level block diagram of a general purpose computer system in which the rendering system of the present invention may be implemented.

FIG. 3 illustrates a high level block diagram of a general purpose computer system in which the image processing system of the present invention may be implemented. A computer system 300 contains a processor unit 305, main memory 310, and an interconnect bus 325. The processor unit 305 may contain a single microprocessor, or may contain a plurality of microprocessors for configuring the computer system 300 as a multi-processor system. The main memory 310 stores, in part, instructions and data for execution by the processor unit 305. If the image processing system of the present invention is wholly or partially implemented in software, the main memory 310 stores the executable code when in operation, such as the logic statements described above. The main memory 310 may include random access memory (RAM), dynamic random access memory (DRAM), as well as high speed cache memory. The main memory may include the memory look-up table 115 described with reference to FIG. 1.

The computer system 300 further includes a mass storage device 320, peripheral device(s) 330, portable storage medium drive(s) 340, input control device(s) 370, a graphics subsystem 350, and an output display 360. For purposes of simplicity and ease of description, all components in the computer system 300 are shown in FIG. 3 as being connected via the bus 325. However, elements of the computer system 300 may be connected through one or more alternate data transport means. For example, the processor unit 305 and the main memory may be connected via a local microprocessor bus, and the mass storage device 320, peripheral device(s) 330, portable storage medium drive(s) 340 and graphics subsystem 350 may be connected via one or more input/output (I/O) busses. Alternatively, the graphics subsystem 350 may be connected with main memory 310 via a dedicated data bus.

The mass storage device 320, which may be implemented with a magnetic disk drive or an optical disk drive, is a non-volatile storage device for storing data and instructions for use by the processor unit 305. In one embodiment, the mass storage device 320 stores the image processing software and look-up table (LUT) contents for loading to the main memory 310.

The portable storage medium drive(s) 340 operates in conjunction with a portable non-volatile storage medium, such as a floppy disk or a compact disc read-only memory (CD-ROM), to input and output encoded data and code to and from the computer system 300 and the processor unit 305, main memory 310, or mass storage device(s) 320 therein. In one embodiment, the image processing software is stored on such a portable medium, and is input to the computer system 300 via the portable medium drive 340.

The peripheral device(s) 330 may include any type of computer support device, such as an input/output (I/O) interface, to add additional functionality to the computer system 300. For example, the peripheral device(s) 330 may include a network interface card for interfacing the computer system to a network, such as a local area network (LAN) or the internet. The input control device(s) 370 provide a portion of the user interface for a user of the computer system 300. The input control device(s) 370 may include an alphanumeric keypad for inputting alphanumeric and other key information, and a cursor control device, such as a mouse, a trackball, stylus, or cursor direction keys.

In order to display textual and graphical information, the computer system 300 contains the graphics subsystem 350 and the output display 360. The output display 360 may include a cathode ray tube (CRT) display or liquid crystal display (LCD). In one embodiment, the graphics subsystem receives image graphical information, and processes the information for output to the output display 360. The components contain in the computer system 300 represent a broad category of such computer components that are well known in the art, and which may be programmed to implement the specific embodiments of the present invention.

The image processing system may be implemented in either hardware or software. For the software implementation, the image processing system is software that includes a plurality of executable instructions for implementation on a general purpose computer system, such as computer system 300. Prior to loading into a general purpose computer system, the image processing software may reside as encoded information on a computer readable medium, such as a magnetic floppy disk, magnetic tape, and compact disc read only memory (CD-ROM). In one hardware implementation, the image processing system may comprise a dedicated processor, either in processing unit 305 or graphics subsystem 350, including instruction for performing the functions described herein.

The foregoing description of specific embodiments is provided to enable any person skilled in the art to make or use the present invention. The various modifications to these embodiments will be readily apparent to those skilled in the art, and the generic principles defined herein may be applied to other embodiments without the use of the inventive faculty. For example, other mathematical functions may be employed by the LUT memory. Similarly, the invention may be embodied completely in software code residing in a computer memory and executed by a processor. Thus, the present invention is not intended to be limited to the embodiments shown herein but is to be accorded the widest possible scope consistent with the principles and novel features disclosed herein, and as defined by the following claims.

What is claimed is:

1. A two-stage correction circuit for processing digital representations of an image attribute, the circuit comprising:
   a data bus configured to provide an input data signal;
   a memory having an address input coupled to the data bus, a data output, and a plurality of memory locations, each memory location including an approximation of a mathematical function of a first portion of the input data signal, at least one first stage delta signal, and at least one second stage delta signal;
   random logic, coupled to the memory to receive the first stage delta signal and the second stage delta signal, and coupled to a portion of said data bus to receive a second portion of the input data signal on an input, and based on the values of the second portion and the first and second stage delta signals, provides an incrementing or decrementing signal; and
   an incrementor coupled to the random logic that increments or decrements the approximation of the mathematical function according to the incrementing or decrementing signal.

2. The circuit of claim 1, wherein the first portion of the input data signal includes a 10-bit address.

3. The circuit of claim 1 wherein the second portion of the input data signal is a 2-bit signal.

4. The circuit of claim 3 wherein the first stage delta signal is a 2-bit signal.

5. The circuit of claim 4 wherein the second stage delta signal is a 1-bit signal.

6. The circuit of claim 5 wherein the random logic provides an incrementing or decrementing signal having:
   a value of the first stage delta signal, when the first bit of the second portion of the input data signal is a "0";
   a value of (1), when the first bit and the second bit of the second portion of the input data signal is "0,1" and the first stage delta is "1,0"; and
   a value of (−1), when the first bit and the second bit of the second portion of the input data signal is "1,1" and the second stage delta is "1".

7. The circuit of claim 1 wherein the output data signal is a 15-bit signal.

8. The circuit of claim 1 wherein the mathematical function is a logarithm, base two, of the input data signal.

9. The circuit of claim 1 wherein the memory is a read-only memory (ROM) look-up table (LUT).

10. The circuit of claim 1 wherein the incremented or decremented approximation is a 12-bit signal.

11. A method for memory efficient correction of processing digital representations of image attributes, the method comprising the steps of:
    dividing an input data signal into a first portion and a second portion, the input data signal representing an image attribute;
    converting, with a memory, the first portion into an output signal, the output signal being one of a plurality of output signals corresponding to one of a plurality of memory locations addressable by the first portion;
    dividing the output signal into an approximation signal, a first stage delta signal, and a second stage delta signal, wherein said approximation is of a mathematical function of said input data signal;

calculating, with random logic, an incrementing or decrementing signal based on a logical value of the second portion of the input data signal, the first stage delta signal, and the second stage delta signal; and incrementing or decrementing the approximation signal with the incrementing or decrementing signal, respectively.

12. The method of claim 11 wherein the second portion of the input data signal is a 2-bit signal.

13. The method of claim 12 wherein the first stage delta signal is a 2-bit signal.

14. The method of claim 13 wherein the second stage delta signal is a 1-bit signal.

15. The method of claim 14, wherein the incrementing or decrementing step further comprises the steps of:

incrementing, by the value of the first stage delta signal, when the first bit of the second portion of the input data signal is a "0";

incrementing, by a value of (1), when the first bit and the second bit of the second portion of the input data signal is "0,1" and the first stage delta is "1,0"; and decrementing, by a value of (−1), when the first bit and the second bit of the second portion of the input data signal is "1,1" and the second stage delta is "1".

16. The method of claim 11, wherein the mathematical function is a logarithm, base two, of the input data signal.

17. An image processing computer system comprising:

a processor unit;

a memory, coupled to the processor unit, for storing a plurality of instructions for execution in said processor unit, said instructions including instructions for:

dividing an input data signal into a first portion and a second portion;

converting the first portion into an output signal according to one of a plurality of memory locations addressable by the first portion;

dividing the output signal into a digital approximation of a mathematical function of the input data signal, a first stage delta signal, and a second stage delta signal;

calculating an incrementing or decrementing signal based on a logical value of the second portion of the input data signal, the first stage delta signal, and the second stage delta signal; and incrementing or decrementing the approximation with the incrementing or decrementing signal, respectively.

18. The computer system of claim 17 wherein the second portion of the input data signal is a 2-bit signal.

19. The computer system of claim 18 wherein the first stage delta signal is a 2-bit signal.

20. The computer system of claim 19 wherein the second stage delta signal is at least a 1-bit signal.

21. The computer system of claim 20, wherein the incrementing or decrementing instruction further comprises the instructions of:

incrementing, by the value of the first stage delta signal, when the first bit of the second portion of the input data signal is a "1";

incrementing, by a value of (1), when the first bit and the second bit of the second portion of the input data signal is "0,1" and the first stage delta is "1,0"; and decrementing, by a value of (−1), when the first bit and the second bit of the second portion of the input data signal is "1,1" and the second stage delta is "1".

22. The computer system of claim 17, wherein the mathematical function is a logarithm, base two, of the input data signal.

23. A method for processing an image, comprising:

converting, with a look-up table, a first portion of a digital representation of said image into an approximation of a mathematical function of said digital representation;

estimating an error between said approximation and an actual mathematical function of said input with a second portion of said digital representation;

calculating an incremental or decremental value based on said error; and respectively incrementing or decrementing said approximation with said incremental or decremental value.

24. The method of claim 23 wherein said look-up table is read-only memory (ROM).

25. The method of claim 23 wherein said mathematical function is a logarithm, base two, of said digital representation.

* * * * *